(12) United States Patent
Nakanishi et al.

(10) Patent No.: US 7,081,744 B2
(45) Date of Patent: Jul. 25, 2006

(54) CABLE LOCATION CONTINUOUSLY DETERMINING APPARATUS, CABLE LOCATION CONTINUOUSLY DETERMINING METHOD, AND CABLE LOCATION CONTINUOUSLY DETERMINING PROGRAM

(75) Inventors: Shinsuke Nakanishi, Tokyo (JP); Kazuhiro Otsuki, Tokyo (JP); Ken Nishiwaki, Tokyo (JP); Kazutoshi Hidaka, Tokyo (JP)

(73) Assignee: NTT Infrastructure Network Corporation, Tokyo (JP)

( * ) Notice: Subject to any disclaimer, the term of this patent is extended or adjusted under 35 U.S.C. 154(b) by 194 days.

(21) Appl. No.: 10/780,453

(22) Filed: Feb. 17, 2004

(65) Prior Publication Data

US 2005/0062475 A1    Mar. 24, 2005

(30) Foreign Application Priority Data

Sep. 22, 2003    (JP) ............................. 2003-330245

(51) Int. Cl.
*G01R 19/00*    (2006.01)
*G01V 3/18*     (2006.01)
*G01V 3/10*     (2006.01)

(52) U.S. Cl. ........................................ 324/67; 324/329
(58) Field of Classification Search .................. 324/67, 324/326, 329
See application file for complete search history.

(56) References Cited

U.S. PATENT DOCUMENTS

| 4,134,061 | A |   | 1/1979 | Gudgel |   |
|---|---|---|---|---|---|
| 4,387,340 | A | * | 6/1983 | Peterman | ..................... 324/326 |
| 4,390,836 | A | * | 6/1983 | Bruce et al. | ................. 324/557 |
| 4,542,344 | A | * | 9/1985 | Darilek et al. | ............... 324/326 |
| 5,001,430 | A | * | 3/1991 | Peterman et al. | ............ 324/326 |
| 5,194,812 | A | * | 3/1993 | Yokoi | ........................... 324/326 |
| 5,719,500 | A | * | 2/1998 | Eschner et al. | .............. 324/329 |
| 5,828,219 | A | * | 10/1998 | Hanlon et al. | ............... 324/529 |
| 6,051,977 | A | * | 4/2000 | Masuda et al. | .............. 324/529 |
| 6,255,825 | B1 | * | 7/2001 | Seigel et al. | ................. 324/331 |
| 6,529,006 | B1 | * | 3/2003 | Hayes | ......................... 324/326 |

FOREIGN PATENT DOCUMENTS

| EP | 1314053 A0 | 8/2001 |
|---|---|---|
| EP | 1321779 A3 | 6/2003 |

(Continued)

OTHER PUBLICATIONS

British Search Report for Application GB0403257.9 dated Jul. 8, 2004.

*Primary Examiner*—Bot Ledynh
*Assistant Examiner*—Kenneth J. Whittington
(74) *Attorney, Agent, or Firm*—Harness, Dickey & Pierce, P.L.L.C.

(57) ABSTRACT

The apparatus can continuously determine the location at which a cable is buried. Location data of a measurement standard position is acquired by RTK-GPS. The azimuth of the moving direction of the apparatus is calculated using the location data. Electromagnetic waves from a metallic wire are received by two electromagnetic signal receiving sections whose locations in the horizontal plane are different from each other, and distances from the measurement standard position to a cable in a measurement base line direction and in the vertical downward direction are calculated using the received electromagnetic signals. The depth of the cable is calculated using the distance in the vertical downward direction. The plane location data of the cable is calculated using the azimuth of the moving direction, the location data of the measurement standard position, and the distance in the measurement base line direction.

5 Claims, 4 Drawing Sheets

FOREIGN PATENT DOCUMENTS

| | | |
|---|---|---|
| GB | 2370582 A | 7/2002 |
| JP | 06-059048 | 3/1994 |
| JP | 06-214043 | 8/1994 |
| JP | 09-287944 | 11/1997 |
| JP | 10-503587 | 3/1998 |
| JP | 10-197648 | 7/1998 |
| JP | 11-153674 | 6/1999 |
| JP | 11-160451 | 6/1999 |
| JP | 2000-221002 | 8/2000 |
| JP | 2001-356177 | 12/2001 |
| JP | 2002-040154 | 2/2002 |
| JP | 2002-048875 | 2/2002 |
| JP | 2003-075546 | 3/2003 |

* cited by examiner

MEASUREMENT STANDARD POSITION

MEASUREMENT BASE LINE
DIRECTION B

CABLE LOCATION CONTINUOUSLY DETERMINING APPARATUS, CABLE LOCATION CONTINUOUSLY DETERMINING METHOD, AND CABLE LOCATION CONTINUOUSLY DETERMINING PROGRAM

BACKGROUND OF THE INVENTION

1. Field of the Invention

The present invention relates to a cable location continuously determining apparatus, a cable location continuously determining method, and a cable location continuously determining program which determine the location of a cable buried in the ground.

Priority is claimed on Japanese Patent Application No. 2003-330245 filed Sep. 22, 2003, the contents of which are incorporated herein by reference.

2. Description of Related Art

When performing construction work to repair a cable which has already been buried or when performing construction work to bury a new cable, it is necessary to determine the location at which an existing cable is buried in order to prevent the existing cable from being damaged. Thus, in the past, various research relating to techniques of determining the location of a cable have been made, and their outcomes have been reported.

For example, in Japanese Unexamined Patent Application, First Publication No. 2001-356177, a weak AC (alternating current) magnetic field originating from a cable buried in the ground is measured from the surface of the earth, while a cable location determining apparatus which is provided with two magnetic sensors whose positions in a horizontal plane are the same and whose heights are different from each other is moved so that the cable location determining apparatus traverses the cable. Based on the measurement results, distances from measurement positions to the location of the cable are calculated. It is then determined that the cable is buried below the measurement position for which the calculated distance is the shortest among the calculated distances for a plurality of measurement positions.

However, the above-described cable location determining apparatus determines the location at which a cable is buried while the cable location determining apparatus is moved in the direction along which the cable location determining apparatus traverses the cable. Therefore, a problem arises in that only the discrete locations of the cable can be obtained.

SUMMARY OF THE INVENTION

It is therefore an object of the present invention to provide a cable location continuously determining apparatus, a cable location continuously determining method, and a cable location continuously determining program which make it possible to continuously determine the location at which a cable is buried.

A first aspect of the present invention is a cable location continuously determining apparatus which determines the location of a cable buried in the ground comprising: a first electromagnetic signal receiving section which receives an electromagnetic signal originating from alternating current flowing through a metallic wire which is integrated or attached to a cable which is the subject of determination; a second electromagnetic signal receiving section whose position in a horizontal plane is different from a position in the horizontal plane of the first electromagnetic signal receiving section and which receives the electromagnetic signal; a location data acquiring section which acquires location data including latitude and longitude of a predetermined location with respect to the apparatus itself; a first location calculation section which calculates location data of the cable which is the subject of determination when taking the predetermined location as a standard using the electromagnetic signal received by the first electromagnetic signal receiving section and the electromagnetic signal received by the second electromagnetic signal receiving section, and which calculates the depth of the cable which is the subject of determination using the calculated location data; and a second location calculation section which calculates plane location data of the cable which is the subject of determination using the location data acquired by the location data acquiring section and the location data calculated by the first location calculation section.

A second aspect of the present invention is a cable location continuously determining method carried out by a cable location continuously determining apparatus which determines the location of a cable buried in the ground, the method comprising: a location data acquiring step which acquires location data including latitude and longitude of a predetermined location with respect to the apparatus itself; a first location calculation step which receives an electromagnetic signal originating from alternating current flowing through a metallic wire which is integrated or attached to a cable which is the subject of determination using a first electromagnetic signal receiving section and a second electromagnetic signal receiving section whose position in the horizontal plane is different from a position in the horizontal plane of the first electromagnetic signal receiving section, and which calculates location data of the cable which is the subject of determination when taking the predetermined location as a standard using the received electromagnetic signal, and which calculates the depth of the cable which is the subject of determination using the calculated location data; and a second location calculation step which calculates plane location data of the cable which is the subject of determination using the location data acquired by the location data acquiring step and the location data calculated by the first location calculation step.

A third aspect of the present invention is a cable location continuously determining program which makes a computer function as a cable location continuously determining apparatus which determines the location of a cable buried in the ground, the apparatus comprising: a location data acquiring section which acquires location data including latitude and longitude of a predetermined location with respect to the apparatus itself; a first location calculation section which receives an electromagnetic signal originating from alternating current flowing through a metallic wire which is integrated or attached to a cable which is the subject of determination using a first electromagnetic signal receiving section and a second electromagnetic signal receiving section whose position in the horizontal plane is different from a position in the horizontal plane of the first electromagnetic signal receiving section, which calculates location data of the cable which is the subject of determination when taking the predetermined location as a standard using the received electromagnetic signal, and which calculates the depth of the cable which is the subject of determination using the calculated location data; and a second location calculation section which calculates plane location data of the cable which is the subject of determination using the location data acquired by the location data acquiring section and the location data calculated by the first location calculation section.

According to the first to third aspects of the present invention, electromagnetic signals originating from alternating current flowing through a metallic wire which is integrated or attached to a cable is received by a first electromagnetic signal receiving section and a second electromagnetic signal receiving section whose positions in the horizontal plane are different from each other. When taking a predetermined location as a standard, location data of the cable is obtained using these electromagnetic signals. Thus, it is possible to continuously determine the cable while moving the cable location continuously determining apparatus along the direction of the cable. In addition, plane location data and depth data of the cable are calculated using the location data of the predetermined location and the location data of the cable when taking the predetermined location as a standard. As a result, it is possible to automatically obtain the plane location data and depth data of the cable which is the subject of determination.

The first aspect of the present invention may further comprises a display section which displays information relating to the location of the cable which is the subject of determination based on the location data of the cable calculated by the first location calculation section.

With this structure, information relating to the location of a cable to be determined is displayed, so that an operator can recognize the approximate location at which the cable is buried.

In the first aspect of the present invention, the location data acquiring section may acquire the location data of the predetermined location by using RTK-GPS.

With this structure, it is possible to obtain the location data with high precision. Moreover, it is not necessary to employ a large device such as a gyrocompass.

DETAILED DESCRIPTION OF THE INVENTION

Figure 1:
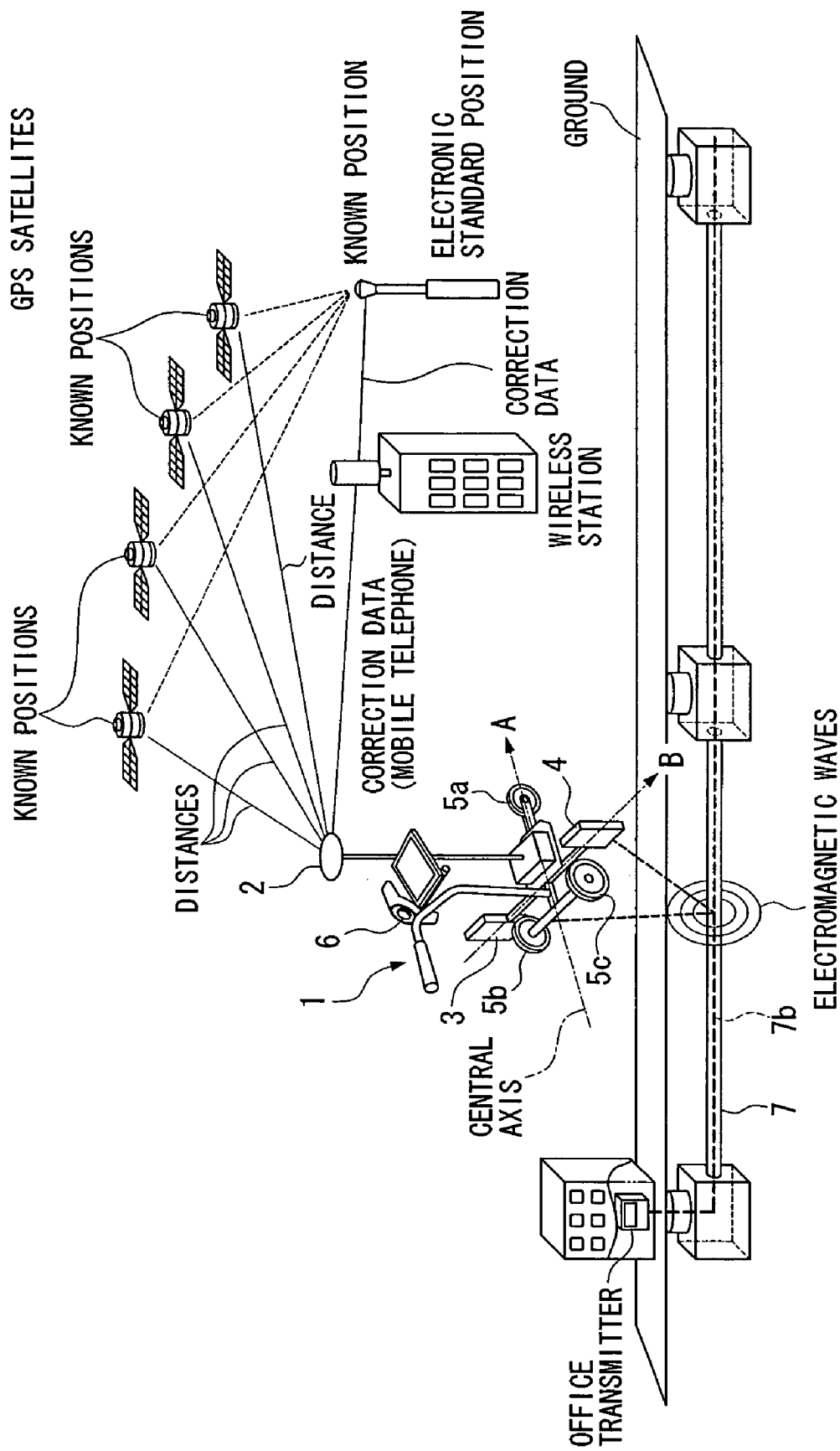
FIG. 1 is a diagram for explaining the mechanism for determining the location of a cable according to an embodiment of the present invention.

First, the mechanism for determining the location of a cable according to an embodiment of the present invention will be explained with reference to FIG. 1. FIG. 1 is a diagram for explaining the mechanism for determining the location of a cable.

As shown in FIG. 1, a cable location continuously determining apparatus 1 is provided with wheels 5a, 5b, and 5c which function as a moving mechanism, thereby allowing the cable location continuously determining apparatus 1 to move along the direction of arrow A shown in FIG. 1. When the location of a cable 7 which is buried in the ground is determined by using the cable location continuously determining apparatus 1, the cable location continuously determining apparatus 1 is moved along the cable 7.

Figure 4:
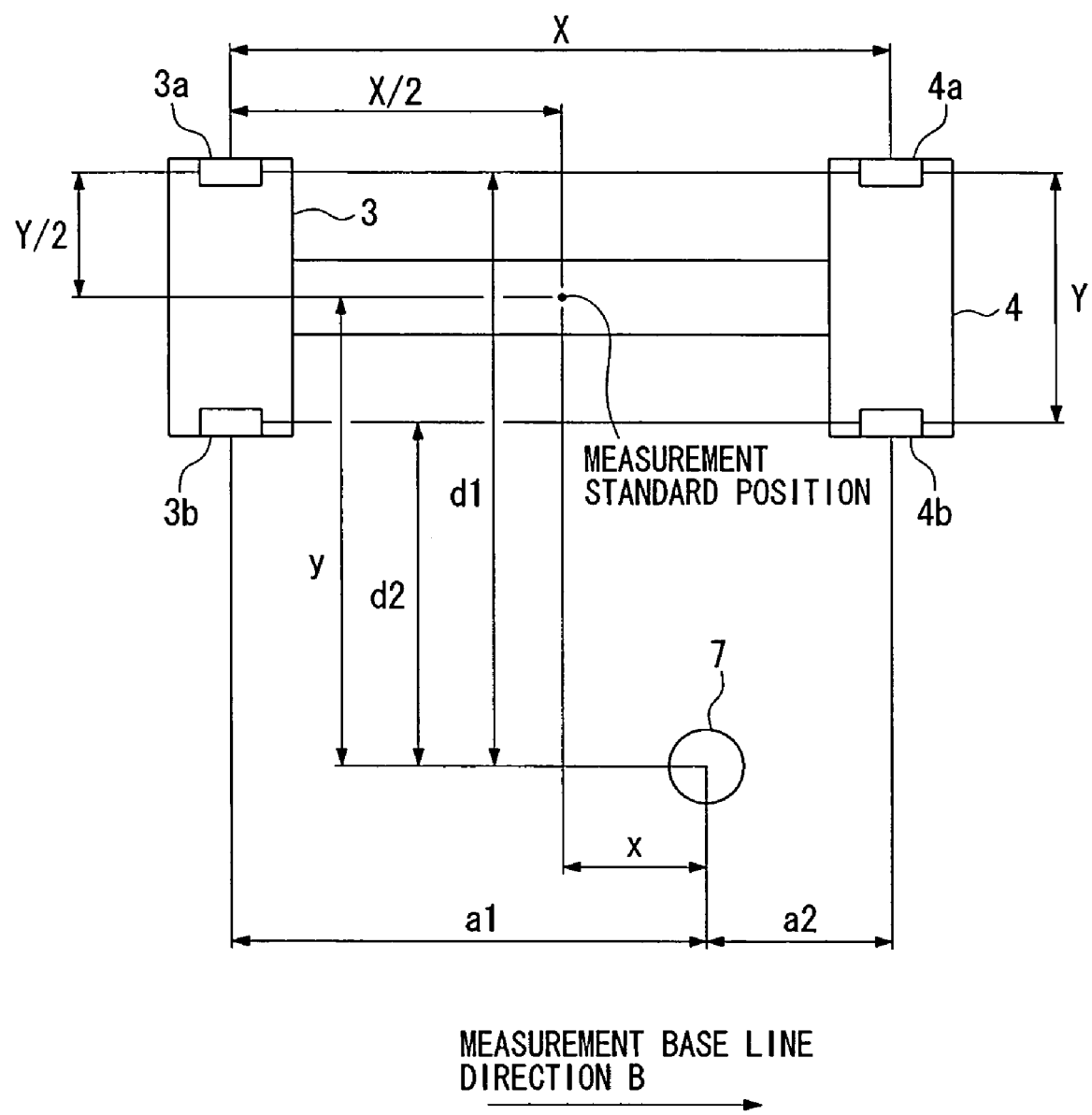
FIG. 4 is a diagram for explaining an electromagnetic signal receiving section shown in FIG. 1.

The cable location continuously determining apparatus 1 is also provided with a GPS antenna 2, and obtains location data including latitude and longitude of a measurement standard position using an RTK-GPS (Real-Time Kinetic Global Positioning System). The measurement standard position is a predetermined location and, in this embodiment, is the midpoint between an electromagnetic signal receiving section 3 and an electromagnetic signal receiving section 4 as shown in FIG. 4. By using this RTK-GPS, the GPS antenna 2 receives electromagnetic waves transmitted from at least four GPS satellites (known positions) and correction data transmitted via a wireless station from an electronic standard position (a known position). Location data of latitude and longitude is obtained by using the electromagnetic waves and the correction data. Since the present embodiment employs RTK-GPS, it becomes possible to obtain location data (i.e., latitude and longitude) with high precision.

The location data of the measurement standard position are continuously acquired while the cable location continuously determining apparatus 1 moves to determine the location of the cable (practically, at a predetermined time interval, for example, at an interval of one second, while moving the cable location continuously determining apparatus 1 at a rate of 1 meter/second), and calculates an azimuth of the moving direction A of the cable location continuously determining apparatus 1 using the location data which have been obtained continuously.

The cable location continuously determining apparatus 1 is further provided with the electromagnetic signal receiving sections 3 and 4 whose positions in a horizontal plane are different from each other. Alternating current is applied to a metallic wire 7b provided in the cable 7 which is the subject of determination using, for example, an office transmitter or a hand-held transmitter. The electromagnetic signal receiving sections 3 and 4 receive the electromagnetic waves generated by the application of the alternating current. The location data of the cable 7 with respect to the measurement standard position is calculated based on the magnetic field intensity of the electromagnetic waves which have been received. This location data includes a distance x between the measurement standard position and the cable 7 in the measurement base line direction B, which is a horizontal direction orthogonal to the moving direction A of the cable location continuously determining apparatus 1 (i.e., the direction from the electromagnetic signal receiving section 3 toward the electromagnetic signal receiving section 4), and a distance y between the measurement standard position and the cable 7 in the vertical downward direction. The depth of the cable 7 is obtained by using the distance y. The value of the distance x becomes positive when the cable 7 is located on the left side with respect to the moving direction of the cable location continuously determining apparatus 1, while it becomes negative when the cable 7 is located on the right side with respect to the moving direction of the cable location continuously determining apparatus 1. It is noted that the details of these will be mentioned later. The timing of acquiring signals used for obtaining the coordinates of the position of the measurement standard position is synchronized with the timing of acquiring signals used for calculating the coordinates of the location of the cable 7 when taking the measurement standard position as a standard.

Figure 2A:
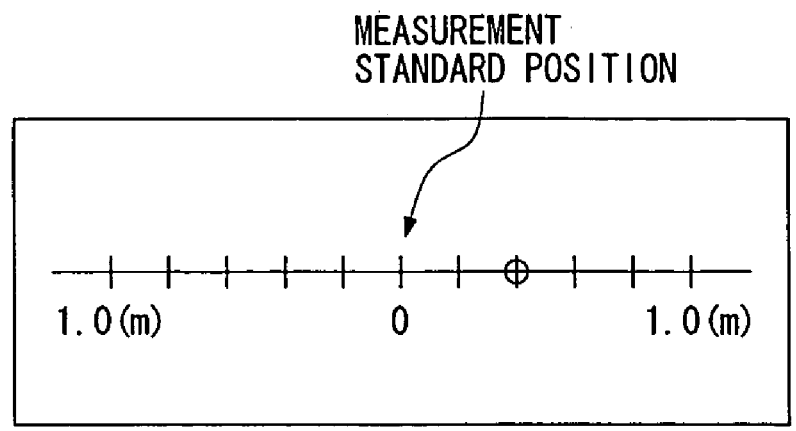
FIGS. 2A and 2B are diagrams showing examples of display on a display panel shown in FIG. 1.

The cable location continuously determining apparatus 1 is also provided with a display panel 6. As shown in FIG. 2A, the display panel 6 displays a screen which shows the location of a cable in the measurement base line direction B when taking the measurement standard position as a standard which has been obtained based on the magnetic field intensity of the electromagnetic waves received by the electromagnetic signal receiving sections 3 and 4, with the location of the cable being indicated by a circle as shown in FIG. 2A. The direction from the left to the right in FIG. 2A is the measurement base line direction B. The above display enables an operator to visually recognize the rough location of the cable in the measurement base line direction B. Although FIG. 2A shows the location of the cable only in the measurement base line direction B, the cable location continuously determining apparatus 1 may be configured so as to show the location of the cable in the vertical downward direction in addition to the location of the cable in the measurement base line direction B.

As described above, the azimuth of the moving direction A of the cable location continuously determining apparatus 1 can be calculated, and the azimuth of the measurement base line direction B can be obtained from the azimuth of the moving direction. The deviations of the cable 7 from the measurement standard position for latitude and longitude are obtained by using the azimuth of the measurement base line direction B and the distance x in the measurement base line direction B from the measurement standard position to the cable 7. Using the deviations for latitude and longitude thus obtained and the latitude and longitude of the measurement standard position, the plane location data for latitude and longitude of the cable 7 are obtained.

The series of the processes described above are carried out continuously during the determination of the location of a cable, and thus the plane location data (latitude and longitude) and the depth data of the location at which a cable is buried can be obtained continuously.

Figure 3:
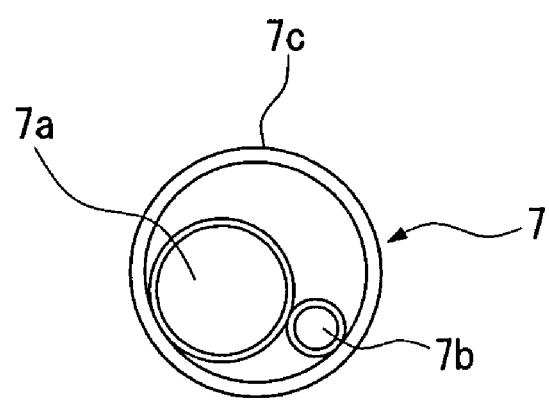
FIG. 3 is a diagram showing a cross sectional view of a cable which is the subject of determination shown in FIG. 1.

Next, the structure of the cable 7 which is the subject of determination will be described with reference to FIG. 3. FIG. 3 is a diagram showing the cross-sectional view of a cable which is the subject of determination. As can be understood from the cross section thereof shown in FIG. 3, the cable which is the subject of determination is configured such that a transmission cable 7a for signal transmission and the metallic wire 7b for applying alternating current are bundled or integrated by using a spiral sleeve 7c which serves as a cable cover. As described above, an office transmitter or a hand-held transmitter applies alternating current to the metallic wire 7b while the location of a cable is determined, and electromagnetic waves are generated by the application of the alternating current. It is noted that the cable may be provided with a metallic wire.

Next, the details of the above-described electromagnetic signal receiving sections 3 and 4 will be explained with reference to FIG. 4. FIG. 4 is a diagram for explaining the electromagnetic signal receiving sections 3 and 4, and the direction of viewer's eyes is the moving direction of the cable location continuously determining apparatus 1.

As shown in FIG. 4, the electromagnetic signal receiving section 3 is provided with a receiving antenna 3a and a receiving antenna 3b which is arranged below the receiving antenna 3a at a location away from the receiving antenna 3a by a distance Y (where Y is a constant). In addition, the electromagnetic signal receiving section 4 is provided with a receiving antenna 4a which has the same height as the receiving antenna 3a and which is arranged at a location away from the receiving antenna 3a by a distance X (where X is a constant) in the measurement base line direction B, and a receiving antenna 4b which is arranged below the receiving antenna 4a at a location away from the receiving antenna 4a by the distance Y. It is noted that the measurement standard position is arranged at a location away from the receiving antenna 3a by the distance X/2 in the measurement base line direction B, that is, the direction from the receiving antenna 3a toward the receiving antenna 4a, and also away from the receiving antenna 3a by the distance Y/2 in the vertical downward direction, that is the direction from the receiving antenna 3a toward the receiving antenna 3b. Needless to say, the measurement standard position moves in line with the movement of the cable location continuously determining apparatus 1.

The distances described below are calculated by using the magnetic field intensity of the electromagnetic waves received by the respective receiving antennas 3a, 3b, 4a, and 4b, which have been generated by a source, that is, alternating current flowing through the metallic wire of the cable. Specifically, the calculated distances are: a distance a1 from the receiving antennas 3a and 3b to the cable 7 which is the subject of determination in the measurement base line direction B; a distance a2 from the cable 7 to the receiving antennas 4a and 4b in the measurement base line direction B; a distance d1 from the receiving antennas 3a and 4a to the cable 7 in the vertical direction; and a distance d2 from the receiving antennas 3b and 4b to the cable 7 in the vertical direction.

Using these calculated distances, the distance x from the measurement standard position to the cable 7 in the measurement base line direction B ($=\{a1-(a1+a2)/2\}$) and the distance y from the measurement standard position to the cable 7 in the vertical direction ($=(d1+d2)/2$) are calculated. Since the height of the measurement standard position from the surface of the earth is known (for example, it can be obtained from a design drawing of the cable location continuously determining apparatus 1), the depth of the cable 7 can be calculated by subtracting the height of the measurement standard position from the surface of the earth from the calculated distance y.

The deviations of the cable 7 from the measurement standard position for latitude and longitude are obtained by using the calculated distance x and the azimuth of the measurement base line direction B which has been calculated as described above. The plane location data for latitude and longitude of the cable 7 are obtained by using the deviations for latitude and longitude thus obtained and the latitude and longitude of the measurement standard position which have been obtained by means of RTK-GPS.

Figure 5:
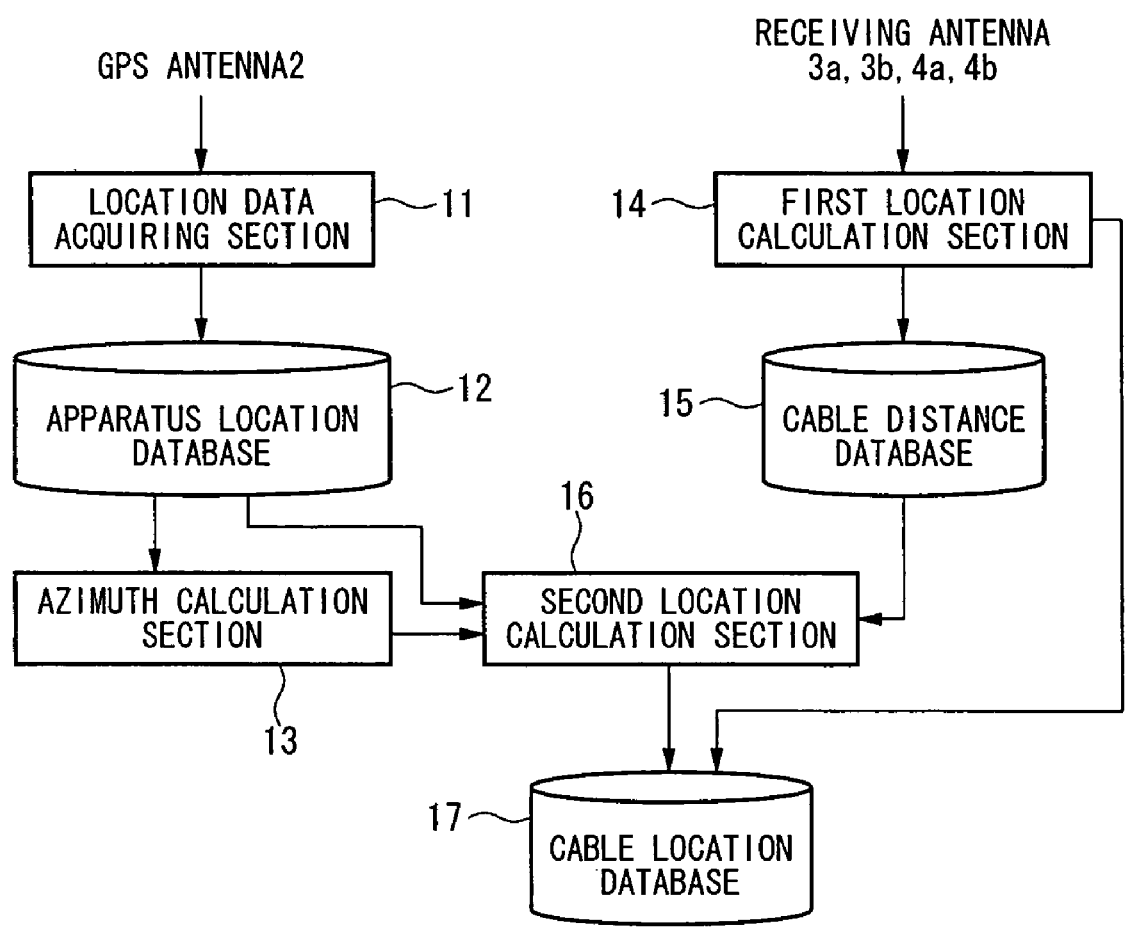
FIG. 5 is a functional block diagram showing the functions of a cable location continuously determining apparatus shown in FIG. 1.

Hereinbelow, the functions of the cable location continuously determining apparatus 1 for realizing the above-described mechanism for determining the location of a cable will be explained with reference to FIG. 5. FIG. 5 is a functional block diagram showing the functions of the cable location continuously determining apparatus.

As shown in FIG. 5, the cable location continuously determining apparatus 1 is provided with a location data acquiring section 11, an apparatus location database 12, an azimuth calculation section 13, a first location calculation section 14, a cable distance database 15, a second distance calculation section 16, and a cable location database 17.

The location data acquiring section 11 continuously acquires location data including the latitude and longitude of the measurement standard position by means of RTK-GPS. The apparatus location database 12 stores the location data of the measurement standard position acquired by the location data acquiring section 11. The location data is associated with the time when electromagnetic waves transmitted from GPS satellites which have been used for acquiring the location data and correction data transmitted from the electronic standard position have been received. The azimuth calculation section 13 calculates the azimuth of the moving direction A of the cable location continuously determining apparatus 1 by using the location data of the measurement standard positions stored in the apparatus location database 12. The azimuth calculation section 13 then calculates the azimuth of the measurement base line direction B from the azimuth of the moving direction thus calculated.

The first location calculation section 14 calculates the distance x from the measurement standard position to the cable in the measurement base line direction B and the distance y from the measurement standard position to the cable in the vertical direction by using the magnetic field intensity of the electromagnetic waves received by the respective receiving antennas 3a, 3b, 4a, and 4b provided in the electromagnetic signal receiving sections 3 and 4. In addition, the first location calculation section 14 calculates the depth of the cable by using the distance y thus obtained and the height of the measurement standard position from the surface of the earth. This depth data is associated with the time when the electromagnetic waves used for calculating the distance y have been received. The cable distance database 15 stores the distance x obtained by the first location calculation section 14 in association with the time when the electromagnetic waves used for calculating the distance x have been received.

The second location calculation section 16 calculates the deviations of the cable 7 from the measurement standard position for latitude and longitude by using the azimuth of the measurement base line direction B calculated by the azimuth calculation section 13 and the distance x from the measurement standard position to the cable in the measurement base line direction B which is stored in the cable distance database 15. The second location calculation section 16 then calculates the plane location data for latitude and longitude of the cable by using the deviations for latitude and longitude thus obtained and the latitude and longitude of the measurement standard position which are stored in the apparatus location database 12. The plane location data for latitude and longitude is associated with the time when the electromagnetic waves used for calculating the distance x have been received. It is noted that the second location calculation section 16 calculates the plane coordinates of the cable by using the location data of the measurement standard positions and the location data of the cable when taking the measurement standard positions as standards.

The cable location database 17 stores the depth data of the cable which have been acquired by the first location calculation section 14 in association with the plane location data of the cable for latitude and longitude which have been acquired by the second location calculation section 16 at the same time when the first location calculation section 14 has acquired the depth data.

The procedure of continuously determining the location of a cable will be described below. First, the electromagnetic waves are generated by applying alternating current to the metallic wire of a cable which is the subject of determination by using, for example, an office transmitter. Subsequently, the cable location continuously determining apparatus 1 is moved.

As a result of the operations of the respective structural elements 11 to 17 shown in FIG. 5 during the movement of the cable location continuously determining apparatus 1, the location data including latitude and longitude of the measurement standard position obtained by means of RTK-GPS are accumulated. In addition, the electromagnetic waves generated by the alternating current flowing through the metallic wire are received, the above-described distances x and y are obtained based on the magnetic field intensity of the electromagnetic waves, and the depth of the cable is obtained from the distance y. The distance x and the depth data of the cable are thus accumulated.

The azimuth of the moving direction of the cable location continuously determining apparatus 1 is obtained from the accumulated location data of the measurement standard positions, and then the azimuth of the measurement base line direction B is obtained from the azimuth of the moving direction. Thereafter, the deviations of the cable from the measurement standard position for latitude and longitude are obtained from the azimuth of the measurement base line direction B and the distance x. The plane location data of the cable for latitude and longitude are obtained from the deviations of the cable for latitude and longitude thus obtained and the latitude and longitude of the measurement standard position, and the obtained plane location data of the cable are accumulated. A series of the above-described processes is carried out at a given interval, and the location data at which the cable is buried (i.e., the depth data and plane location data) is obtained.

It is noted that during the processes of determining the cable location by the cable location continuously determining apparatus 1, the obtained cable location data are displayed on the display panel 6 at a given interval.

Since the above-described embodiment is provided with the electromagnetic signal receiving section 3 and the electromagnetic signal receiving section 4 whose locations in the horizontal plane are different from each other, the cable location data when taking the measurement standard position as a standard can be obtained. As a result, the determination of the location of a cable can be carried out continuously. In addition, the azimuth of the moving direction is calculated based on the location data of the measurement standard position obtained by means of RTK-GPS, it is advantageous in that it is not necessary to employ a large device such as a gyrocompass. Furthermore, the time required for calculating the azimuth according to the present embodiment is shorter than the time required for calculating the azimuth using a gyrocompass, so that the present embodiment is particularly useful when the cable location is displayed while determining the cable location.

Figure 2B:
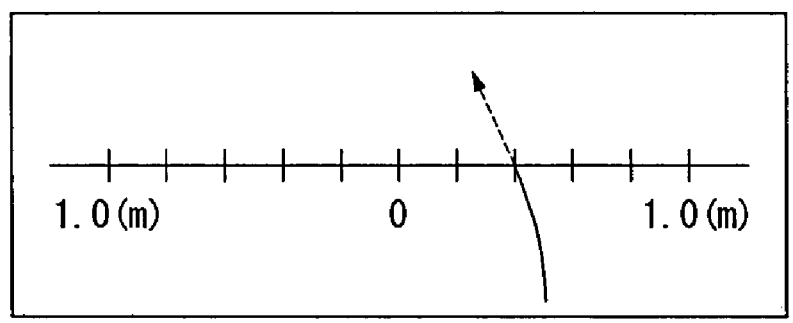

While a preferred embodiment of the invention has been described and illustrated above, it should be understood that it is exemplary of the invention and is not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims. For example, a mechanism may further be provided which displays the location at which the cable is buried on a map which is drawn based on map data including latitude and longitude by using the plane location data including latitude and longitude of the cable which have been obtained by determination. In addition, the depth of the cable may be calculated using the height data as well which is obtained by means of RTK-GPS. Moreover, when the location data of the measurement standard position could not be obtained by means of RTK-GPS, for example, when the cable location continuously determining apparatus is passing through a tunnel, the location of the measurement standard position may be calculated based on the deflection angle of the cable location continuously determining apparatus obtained by using a gyrocompass and a distance which the cable location continuously determining apparatus has moved. Furthermore, as shown in FIG. 2B, a locus of the cable may be displayed based on the cable locations which have been obtained, and a predicted direction along which a cable extends may be displayed using an arrow. For example, the direction of the alternating current which has been measured or the direction connecting the last two cable locations which have been measured can be used as the predicted direction along which a cable extends. As a result, an operator can visually recognize where the cable exists and can predict the direction along which the cable extends. Furthermore, the cable location may be displayed in a three-dimensional manner.

It is also possible for a program which realizes the functions of the respective structural elements of the above-described cable location continuously determining apparatus to be recorded on a computer readable recording medium, and for the programs recorded on this recording medium to be loaded on a computer system and to be executed by the computer system, thereby carrying out the above processes of determining the location of a cable. It is noted that a computer system includes OS (operating system) and hardware such as peripheral devices. Furthermore, in the event that the WWW system is employed, the computer system also includes a home page provision environment and a home page display environment. The term "computer readable recording medium" refers to a transportable medium such as a flexible disk, a magneto-optical disk, ROM (read only memory), a CD-ROM (compact disk), and the like, or to a storage device such as a hard disk installed in a computer system. "Computer readable recording medium" also includes mediums that hold programs for a certain period of time such as volatile memory (RAM) in a computer system which is a server or a client when programs are transmitted via a communication line such as a telephone line or a network such as the Internet.

Moreover, the above program may also be transferred from a computer system having a storage device or the like on which the program is stored via a transfer medium, or via a transfer wave in the transfer medium to another computer system. Here, the transfer medium that transfers the programs is a medium having a function of transferring information such as a communication line such as a telephone line or a network such as the Internet. Moreover, the above program may also be designed to perform a portion of the aforementioned functions. It may also be what is known as a differential file (differential program) that can achieve these functions in combination with a program that is already recorded on a computer system.

What is claimed is:

1. A cable location continuously determining apparatus which determines the location of a cable buried in the ground comprising:
    a first electromagnetic signal receiving section which receives an electromagnetic signal originating from alternating current flowing through a metallic wire which is integrated or attached to a cable which is the subject of determination;
    a second electromagnetic signal receiving section whose position in a horizontal plane is different from a position in the horizontal plane of the first electromagnetic signal receiving section and which receives the electromagnetic signal;
    a location data acquiring section which acquires location data including latitude and longitude of a predetermined location with respect to the apparatus itself;
    a first location calculation section which calculates location data of the cable including a distance in a measurement base line direction and a distance in a vertical direction, the measurement base line direction being a direction from the first electromagnetic signal receiving section toward the second electromagnetic signal receiving section and being a horizontal direction orthogonal to a moving direction of the apparatus itself, when taking the predetermined location as a standard, using the electromagnetic signal received by the first electromagnetic signal receiving section and the electromagnetic signal received by the second electromagnetic signal receiving section, and which calculates the depth of the cable using the distance in the vertical direction included in the calculated location data;
    an azimuth calculation section which calculates an azimuth of the moving direction of the apparatus itself using the location data acquired by the location data acquiring section, and which calculates an azimuth of the measurement base line direction from the calculated azimuth of the moving direction of the apparatus itself; and
    a second location calculation section which calculates deviations of the cable from the predetermined location for latitude and longitude using the azimuth of the measurement base line direction calculated by the azimuth calculation section and the distance of the cable in the measurement base line direction included in the location data calculated by the first location calculation section taking the predetermined location as the standard, and calculates plane location data of the cable for latitude and longitude using the calculated deviations, and the latitude and the longitude included in the location data acquired by the location data acquiring section,
    wherein the plane location data and the death of the cable are continuously obtained while the apparatus itself is being moved.

2. A cable location continuously determining apparatus according to claim 1, further comprising a display section which displays information relating to the location of the cable which is the subject of determination based on the location data of the cable calculated by the first location calculation section.

3. A cable location continuously determining apparatus according to claim 1, wherein the location data acquiring section acquires the location data of the predetermined location by using RTK-GPS.

4. A cable location continuously determining method carried out by a cable location continuously determining apparatus which determines the location of a cable buried in the ground, the method comprising:
    a location data acquiring step which acquires location data including latitude and longitude of a predetermined location with respect to the apparatus itself;
    a first location calculation step which receives an electromagnetic signal originating from alternating current flowing through a metallic wire which is integrated or attached to a cable which is the subject of determination using a first electromagnetic signal receiving section and a second electromagnetic signal receiving section whose position in a horizontal plane is different from a position in the horizontal plane of the first electromagnetic signal receiving section and which receives the electromagnetic signal, and which calculates location data of the cable including a distance in a measurement base line direction and a distance in a vertical direction, the measurement base line direction being a direction from the first electromagnetic signal receiving section toward the second electromagnetic signal receiving section and being a horizontal direction orthogonal to a moving direction of the apparatus itself, when taking the predetermined location as a standard, using the received electromagnetic signal, and which calculates the depth of the cable using the distance in the vertical direction included in the calculated location data;

an azimuth calculation step which calculates an azimuth of the moving direction of the apparatus itself using the location data acquired by the location data acquiring step, and which calculates an azimuth of the measurement base line direction from the calculated azimuth of the moving direction of the apparatus itself; and a second location calculation step which calculates deviations of the cable from the predetermined location for latitude and longitude using the azimuth of the measurement base line direction calculated by the azimuth calculation step and the distance of the cable in the measurement base line direction included in the location data calculated by the first location calculation step taking the predetermined location as the standard, and calculates plane location data of the cable for latitude and longitude using the calculated deviations, and the latitude and the longitude included in the location data acquired by the location data acquiring steps, wherein the plane location data and the depth of the cable are continuously obtained while the apparatus itself is being moved.

5. A cable location continuously determining program which makes a computer function as a cable location continuously determining apparatus which determines the location of a cable buried in the ground, the apparatus comprising:

a first electromagnetic signal receiving section which receives an electromagnetic signal originating from alternating current flowing through a metallic wire which is integrated or attached to a cable which is the subject of determination;

a second electromagnetic signal receiving section whose position in a horizontal plane is different from a position in the horizontal plane of the first electromagnetic signal receiving section and which receives the electromagnetic signal;

a location data acquiring section which acquires location data including latitude and longitude of a predetermined location with respect to the apparatus itself;

a first location calculation section which calculates location data of the cable including a distance in a measurement base line direction and a distance in a vertical direction, the measurement base line direction being a direction from the first electromagnetic signal receiving section toward the second electromagnetic signal receiving section and being a horizontal direction orthogonal to a moving direction of the apparatus itself, when taking the predetermined location as a standard, using the electromagnetic signal received by the first electromagnetic signal receiving section and the electromagnetic signal received by the second electromagnetic signal receiving section, and which calculates the depth of the cable using the distance in the vertical direction included in the calculated location data;

an azimuth calculation section which calculates an azimuth of the moving direction of the apparatus itself using the location data acquired by the location data acquiring section, and which calculates an azimuth of the measurement base line direction from the calculated azimuth of the moving direction of the apparatus itself; and a second location calculation section which calculates deviations of the cable from the predetermined location for latitude and longitude using the azimuth of the measurement base line direction calculated by the azimuth calculation section and the distance of the cable in the measurement base line direction included in the location data calculated by the first location calculation section taking the predetermined location as the standard, and calculates plane location data of the cable for latitude and longitude using the calculated deviations, and the latitude and the longitude included in the location data acquired by the location data acquiring section, wherein the plane location data and the depth of the cable are continuously obtained while the apparatus itself is being moved.

* * * * *